Nov. 7, 1967
J. J. FESCO
3,350,857
VACUUM CLEANER FILTER BAG
Filed June 26, 1964
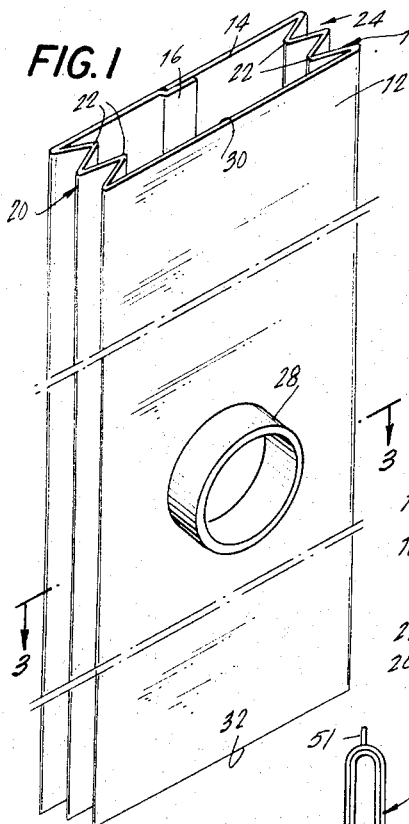
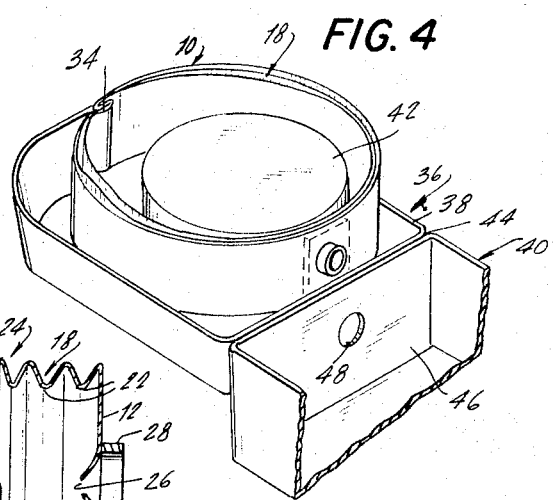
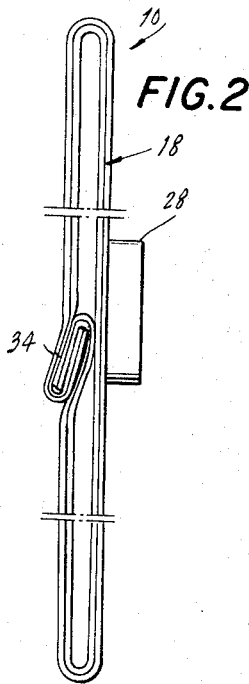
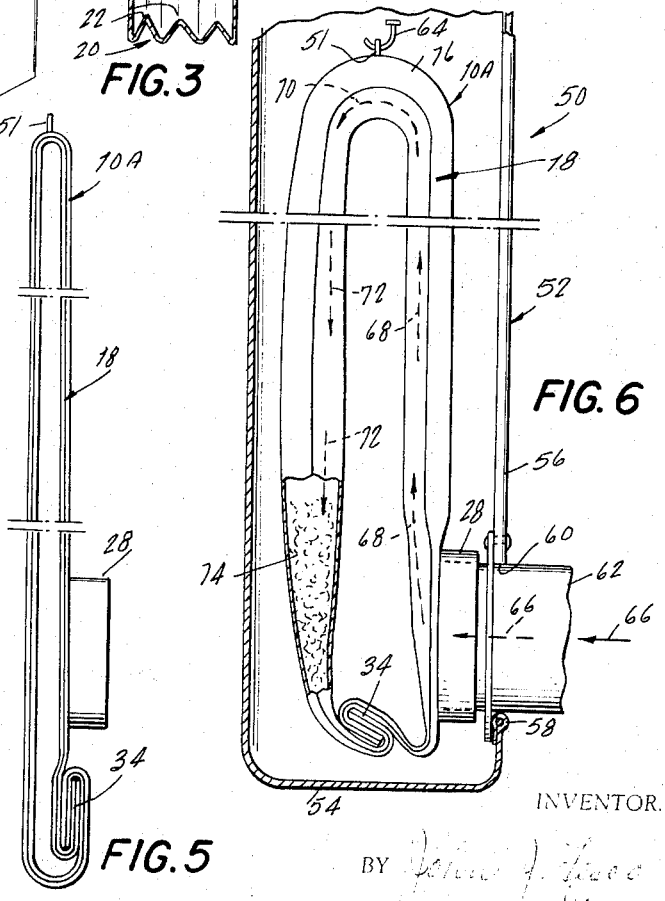
INVENTOR.
BY *John J. Fesco*
*Friedman & Goodman*
ATTORNEYS

United States Patent Office

3,350,857
Patented Nov. 7, 1967

3,350,857
VACUUM CLEANER FILTER BAG
John J. Fesco, Baldwin, N.Y., assignor to Studley Paper Company, Inc., a corporation of New York
Filed June 26, 1964, Ser. No. 378,186
4 Claims. (Cl. 55—363)

The present invention relates to vacuum cleaner filter bags.

An ever-recurrent problem involved in the utilization of vacuum cleaner filter bags of the expendable type is the prevention of the escape of the captured dirt or dust through the opening into the filter bag through which the incoming air stream carries the dirt and dust into the filter bag. Various different solutions have been suggested for this problem in the prior art. Among such solutions are the utilization of an internal pipe or tube within the filter bag so as to carry the dirt to a point quite remote from the entrance opening into the bag to prevent the inadvertent escape of the dirt through the entrance opening. Another solution involves the use of a valve which will prevent the escape of the trapped dirt or dust. Either solution results in an increase in the cost of manufacture of the bag and a consequent, resulting increase in the sales price thereof.

It is an object of the present invention to provide a filter bag in which the entrapped dirt or dust is prevented from inadvertent escape through the entrance opening without the necessity of providing either a valve or a special internal tube within the bag.

It is another object of the present invention to provide a highly novel and efficient vacuum cleaner filter bag which can be manufactured at a relatively low cost and sold at a relatively low price.

It is a further object of the present invention to provide a generally improved filter bag which overcomes the deficiencies of prior art filter bags.

Other and further objects and advantages of the present invention will become readily apparent to one skilled in the art from a consideration of the following specification, taken in connection with the appended drawing which illustrates the best mode presently contemplated for carrying out the invention. In the drawings:

FIGURE 1 is a fragmentary elevation view of a vacuum cleaner filter bag pursuant to the present invention;

FIGURE 2 is a side elevation view of the filter bag on a reduced scale;

FIGURE 3 is a sectional view taken on the line 3—3 of FIGURE 1;

FIGURE 4 is a view which illustrates the vacuum cleaner filter bag mounted within the canister of a canister-type vacuum cleaner;

FIGURE 5 is a view similar to FIGURE 2 and illustrates a modification; and

FIGURE 6 is an elevation view partially in section of a vacuum cleaner filter bag of the type illustrated in FIGURE 5, mounted within an upright vacuum cleaner.

Referring now to FIGURES 1 through 4 of the drawing in detail, there is shown a vacuum cleaner filter bag 10 pursuant to the present invention. The filter bag 10 is fabricated from a blank of suitable filter paper. The blank is folded upon itself to form the opposing front and rear walls 12 and 14 respectively, the opposing longitudinal edges of the blank being secured together in air-tight relation as at 16. The front and rear walls are inter-connected by integral side walls 18 and 20, each of which is provided with a plurality of pleats 22. The blank is first formed, therefore, into an elongated tube which is illustrated in FIGURE 1 and which is generally indicated by the reference numeral 24. The front wall 12 of the tube is suitably apertured as at 26 to provide an entrance opening. A suitable collar 28 formed of suitable, rigid material is provided on the outer surface of the front wall 12 and encompasses the entrance opening 26.

As best shown in FIGURES 2 and 4, the vacuum cleaner filter bag 10 is in the form of a toroid. It will be noted that the opposite ends 30 and 32 of the tubular member 24 are open. In order to convert the open-ended tube 24 into the toroid 10, the open ends 30 and 32 are suitably secured to each other and the tube is folded upon itself at the secured opposite ends 30 and 32 thereof as generally indicated by the reference numeral 34. It will be understood that the various portions of the folded-over ends 34 are suitably secured and sealed to each other so that the multi-folded portion 34 constitutes an air-tight seal. Consequently, it will be apparent that when the tube 24 has its open ends 30 and 32 closed by securing said ends together and then folding them over upon themselves to form the multi-fold seal 34, there is provided the bag 10 in the form of a toroid. It will also be noted, as best shown in FIGURES 2 and 4, that the sealed ends 34 are in opposition to the aperture 26 and collar 28 in the inoperative condition of the bag illustrated in FIGURE 2 and that the folded-over sealed ends 34 are diametrically opposed to the aperture 26 and collar 28 when the toroid is opened up into circular or toroidal form, as best shown in FIGURE 4.

The toroidal bag 10 is intended to be used in a canister-type of vacuum cleaner which is generally indicated by the reference numeral 36 in FIGURE 4. As here shown, the canister 36 comprises a housing 38 and a cover 40 for the housing.

It will be understood that the cover 40 is suitably hinged to the housing 38. The housing 38 mounts a vacuum cleaner motor which is generally indicated by the reference numeral 42. The vacuum cleaner bag 10 is opened up into circular or toroidal form and is disposed about the motor casing 42 with the sealed ends 34 remote from the junction of 44 of the casing 38 and cover 40 therefor. It will be noted that the collar 28 is adjacent said junction. Moreover, it will be noted that the cover 40 is provided with an end wall 46 which is hinged to the housing 38 at the junction of 44, said end wall being provided with an aperture 48. It will be understood that when the cover 40 is mounted in position to overlie and cover the housing 38, the cover will also cover or encompass the bag 10 and the collar 28 of the bag will be accessible through the opening 48 or extend through the opening 48 in the cover 40. In the operation of the canister vacuum cleaner 36, the air-inlet conduit of the vacuum cleaner engages the collar 28 through the aperture 48 so as to supply the dirt-laden air to the bag 10.

Prior art bags of the type used in canister vacuum cleaners 36 would, when filled with the dirt-laden air, tend to flap or move within the housing, said bags in essence having two arms, one at either side of the collar 28, which arms would be free to move within the housing 36 during the passage of the dirt-laden air therethrough. However, due to the fact that the ends of the bag 10 are sealed together at the multi-fold sealed portion 34 thereof, so that the bag is in toroidal form, the flapping of the ends characteristic of prior art bags is completely eliminated. As a result, the bag 10 remains substantially stationary within the closed housing 38. The flapping ends of the prior art bags tended to move the trapped dirt or dust back toward the opening 26 and collar 28. However, pursuant to the present invention, due to the fact that the described flapping action has been completely eliminated, the dirt tends to collect in the bag 10 at both sides of the multi-folded ends 34 and remains there during the vacuum cleaning operation. Moreover, since the dirt tends to collect and lodge at both sides of the sealed ends 34, when a dirt-laden bag is removed from the vacuum cleaner 36 by grasping the collar 28, the dirt cannot inadvertently escape through the collar since the trapped dirt tends to be packed at both sides of the collar 28 toward the sealed ends 34.

Referring now to FIGURES 5 and 6 in detail, there is illustrated a vacuum cleaner bag 10A which is similar in all respects to the previously-described toroidal vacuum cleaner bag 10 except that the bag 10A is modified for operation or use in an upright vacuum cleaner 50. For this purpose, the aperture 26 and collar 28 are not formed in opposition to the multi-fold sealed ends 34, as shown in FIGURE 2, but the aperture 26 and collar 28 are formed on the front wall 12 adjacent the multi-fold sealed ends 34, as best shown in FIGURE 5. In addition, the bag 10A is provided with a hanger 51 substantially opposite the multi-fold sealed ends 34, as shown in FIGURE 5. Consequently, in the inoperative condition of the bag, when the hanger 51 is at the uppermost portion of the bag, the sealed ends 34 will be adjacent the lowermost portion of the bag.

In order to accommodate the toroidal bag 10A, the vacuum cleaner 50 which, as previously indicated, is of the upright type, is provided with an upright housing or casing 52. The casing 52 comprises a housing 54 and a cover 56 which is hinged to the casing as at 58. The cover 56 is provided with a front opening 60 for the insertion therethrough of the end of a vacuum cleaner conduit 62.

The bag 10A is mounted within the housing 54 of the casing 52 by suspending the hanger 51 on a hook 64 provided within the housing 54. It will be noted that when the toroid 10A is so suspended on the hook 64, the sealed ends 34 thereof are at the bottom of the housing 54 and the collar 28 is positioned adjacent the opening 60 in the casing cover 56 so that the conduit 62 may be inserted through the opening 60 into the collar 28.

In operation of the vacuum cleaner 50 of the upright type, the dust-laden air passes through the conduit, into the toroidal bag 10A as indicated by the arrow heads 66. Upon entering the bag 10, the dust-laden air can flow only in one direction, namely in an upward direction, as indicated by the arrows 68, due to the fact that the adjacent sealed ends 34 prevent the movement of the air through the bag in a downward direction. Consequently, the dust-laden air flows upwardly toward the top of the bag, as indicated by the arrows 68, and then turns at the top of the bag, as indicated by the arrows 70, and flows downwardly toward the sealed ends 34, as indicated by the arrows 72. As a result of the downward flow of the air, the trapped dust, which is generally indicated by the reference numeral 74, begins to build up adjacent to the sealed ends 34 and it will therefore be apparent that continuous use of the vacuum cleaner will tend to cause the trapped dust 74 to build up upwardly toward the upper end of the bag, as shown in position in FIGURE 6. When the trapped dust reaches a point adjacent to the upper bend 76 of the bag 10A, the bag should be removed and replaced by a clean bag. In order to accomplish this, after the cover 56 of casing 52 has been opened, and the conduit 62 disconnected from the collar 28, it is necessary only to disengage the bag hanger 51 from the hook 64. Holding the hanger uppermost, the trapped dust 74 can never escape by passing over the bend 76 and then falling downwardly and outwardly through the collar 28. This can be readily assured by holding the collar 28 uppermost during the removal of the bag from the housing 54. Also, it will be readily apparent that any turbulence which is caused in the dust 74 trapped in the bag during the operation of the vacuum cleaner will not reach the aperture 26 and collar 28 since the bent portion of the bag 76 at the upper end of the bag, as disposed within the vacuum cleaner, acts as a trap to prevent movement of the dust-laden turbulence downwardly from the upper bend 76 toward the collar 28.

In view of the foregoing, it will be apparent that there has been illustrated and described herein a highly novel vacuum cleaner filter bag of toroidal construction. It will be understood that various changes and modifications may be made therein without, however, departing from the inventive concept thereof, as set forth in the appended claims.

I claim:

1. A vacuum cleaner filter bag comprising an elongated tubular member formed of filter sheet material, the opposite ends of said member being secured together to form said tubular member into substantially elliptical conformation, said tubular member being folded upon itself at said ends and said end folds being secured together to define an air-impermeable seal, and an air inlet aperture defined in said tubular member, said mutually secured ends being disposed adjacent to said aperture, and a hanger element provided on said member, said hanger element being disposed remotely from said mutually secured ends.

2. A vacuum cleaner filter bag comprising an elongated tubular member formed of filter sheet material, the opposite ends of said member being secured together to form said tubular member substantially into ellipsoidal configuration, said tubular memer being folded upon itself at said ends and said end folds being secured together to define a multifold air impermeable seal, and an air inlet aperture defined in said tubular member.

3. A vacuum cleaner filter bag as in claim 2, and a hanger element provided on said tubular member.

4. A vacuum cleaner filter bag as in claim 3, said hanger element being an eyelet adapted to be engaged by a hook.

References Cited

UNITED STATES PATENTS

| | | | |
|---|---|---|---|
| 1,215,868 | 2/1917 | Rosenfeld | 229—53 |
| 1,363,753 | 12/1920 | Quinn | 55—381 X |
| 1,835,770 | 12/1931 | Gasner et al. | 55—382 X |
| 2,000,854 | 5/1935 | Leathers | 55—381 X |
| 2,024,143 | 12/1935 | Cameron | 55—368 |
| 2,056,831 | 10/1936 | Daniels et al. | 55—368 |
| 2,133,141 | 10/1938 | Holm-Hansen | 55—381 X |
| 2,174,730 | 10/1939 | White | 55—381 X |
| 2,364,069 | 12/1944 | Hahn | 55—368 |
| 2,520,877 | 8/1950 | Cavanagh | 55—363 X |
| 2,607,436 | 8/1952 | Martin | 55—381 X |
| 2,734,594 | 2/1956 | Meeker | 55—363 |
| 2,771,152 | 11/1956 | Bramhall et al. | 55—363 |
| 2,945,558 | 7/1960 | Cordell | 55—376 |
| 3,200,571 | 8/1965 | Shufflebotham | 55—367 |
| 3,209,523 | 10/1965 | Smithson | 55—374 |

FOREIGN PATENTS 175,831   6/1935   Switzerland.

HARRY B. THORNTON, *Primary Examiner.*

D. TALBERT, *Assistant Examiner.*